United States Patent [19]

Nakagawa et al.

[11] 3,902,100

[45] Aug. 26, 1975

[54] DYNAMIC CONVERGENCE CIRCUIT

[75] Inventors: Yutaka Nakagawa; Yoshio Shibata, both of Tokyo; Hajime Yoneta, Yokohama, all of Japan

[73] Assignee: Sony Corporation, Tokyo, Japan

[22] Filed: Mar. 26, 1974

[21] Appl. No.: 454,932

[30] Foreign Application Priority Data

Mar. 30, 1973 Japan ............................... 48-38419

[52] U.S. Cl................ 315/371; 315/13 C; 315/368; 315/400

[51] Int. Cl.$^{2}$ H01J 29/56; H01J 29/70; H01J 29/76

[58] Field of Search....... 315/27 SR, 27 GD, 27 TD, 315/13 C, 368, 371, 400

[56] References Cited

UNITED STATES PATENTS

| | | | |
|---|---|---|---|
| 2,706,796 | 4/1955 | Tannenbaum et al. ........... | 315/13 C |
| 2,999,186 | 9/1961 | Pritchard et al. ................ | 315/13 C |

*Primary Examiner*—Maynard R. Wilbur
*Assistant Examiner*—T. M. Blum
*Attorney, Agent, or Firm*—Lewis H. Eslinger; Alvin Sinderbrand

[57] ABSTRACT

A circuit for supplying a current to a dynamic convergence coil on a color cathode ray tube for dynamically correcting misconvergence of electron beams in the tube, which comprises current producing means to cause a parabolic current having a period of the line interval to flow through the dynamic convergence coil in response to a horizontal pulse train, modulating means for modulating in amplitude the parabolic current by means of a parabolic voltage having a period of the field interval supplied thereto and voltage supplying means for supplying the parabolic voltage to the dynamic convergence coil further to modulate in amplitude the modulated parabolic current flowing therethrough by the parabolic voltage, whereby a current having a waveform required for properly correcting the misconvergence is easily supplied to the dynamic convergence coil.

6 Claims, 8 Drawing Figures

DYNAMIC CONVERGENCE CIRCUIT

BACKGROUND OF THE INVENTION

1. Field of the Invention

This invention relates generally to a dynamic convergence circuit for a color cathode ray tube, and more particularly to an improved circuit for producing a signal for dynamically correcting misconvergence of electron beams in a color cathode ray tube.

2. Description of the Prior Art

It is quite usual in color television receivers employing a color cathode ray tube of the multibeam type that dynamic correction of beam misconvergence on a screen of the tube is provided. The beam misconvergence requiring to be dynamically corrected is caused due to vertical and horizontal beam deflections. That is, a beam path between a substantial beam deflection center and the screen becomes longer in proportion as a beam deflection angle increases, so in the case that plural beams are arranged to converge properly on the central portion of the screen, the beams converge at a plane spaced toward the substantial beam deflection center from the screen when they are deflected to land on a portion of the screen distant from the central portion of the screen and, consequently, the beams impinge on such a portion of the screen in respective paths diverging each other from the plane where the beams have properly converged. This results in the beam misconvergence on the screen and the amount of such a beam misconvergence generally becomes larger as the beam landing place becomes distant from the central portion of the screen.

Usually, on the color television receiver a dynamic convergence coil device has been provided to produce an auxiliary magnetic field in addition to a main beam deflection field in order to give the beams a correcting deflection for compensating for the misconvergence such as mentioned above. In such a coil device, a current having a peculiar waveform which, for example, varies in line and field rates, is required to flow therethrough to achieve an adequate compensation for the misconvergence, especially in the case that the coil device is employed on cathode ray tubes with a wide beam deflection angle, a required current has to have a very complicated waveform.

There have been proposed many kinds of dynamic convergence circuits to produce and supply the current having the peculiar waveform required for the adequate compensation for the misconvergence. However, the conventional circuits have several drawbacks. They are complicated in circuit construction, they require a number of elements, and they are relatively expensive. Further, it is not so easy for them to produce the current having a waveform correctly coinciding with the required waveform.

SUMMARY OF THE INVENTION

Accordingly, it is an object of the present invention to provide an improved dynamic convergence circuit for supplying a current to an electromagnetic device for correcting dynamically beam misconvergence in a color cathode ray tube.

Another object of the present invention is to provide a dynamic convergence circuit for supplying a correcting current to an electromagnetic beam misconvergence correcting device on a cathode ray tube of a plural beam type, which produces the correcting current having a peculiar waveform required for dynamic beam misconvergence correction by means of simple construction.

Other objects, features and advantages of the present invention will be apparent from the following description taken in conjunction with the accompanying drawings.

DESCRIPTION OF THE PREFERRED EMBODIMENT

Figure 1:
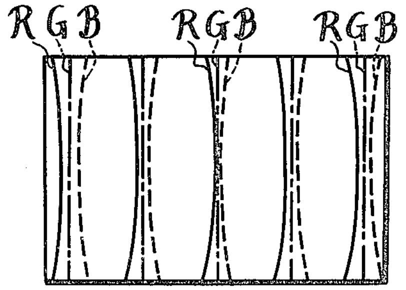
FIG. 1 is a schematic illustration showing a pattern of beam misconvergence on a screen of a color cathode ray tube.

Generally speaking, in a color television receiver employing a color cathode ray tube in which plural electron beams are produced, a dynamic compensation is required for beam misconvergence on a screen of the color cathode ray tube which is caused by vertical and horizontal deflections of the electron beams. Various patterns of the beam misconvergence may be considered dependent upon the type of a cathode ray tube and the type of its beam deflection magnetic field, and in the case that a so-called in-line color cathode ray tube in which three electron beams to be modulated by red R, green G and blue B color signals are arranged on a common horizontal plane is used, if a beam deflection coil device which may produce a deflection field of substantially uniform flux distribution is employed, the beam misconvergence as shown in FIG. 1 may occur on the screen of the cathode ray tube. That is, the three electron beams which are arranged in the common horizontal plane and correspond to R, G and B color signals are subjected to such a static convergence that they land on the central portion of the screen with the proper convergence. However, as the landing position of the electron beams on the screen moves from the central portion of the screen to its peripheral portion by the vertical and horizontal beam deflection operation, the beam misconvergence occurs. This beam misconvergence is caused by the fact that the curvature of the screen of the cathode ray tube is smaller than the curvature of the spherical surface passing the central portion of the screen and having a center at a substantial deflection center of the electron beams, that is, the former is greater than the latter in radius and, consequently, the distance between the landing position of the electron beams on the screen and the substantial deflection center of the electron beams increases as the landing position of the electron beams becomes apart from the central portion of the screen. As a result, the electron beams are converged before the screen on the area other than its central portion and hence the electron beams land on the screen on their diverging paths. The degree of this electron beam divergence increases as the landing position of the electron beams approaches to the peripheral portion of the screen and consequently a space between the landing spots of each electron beam on the screen becomes greater.

Such a misconvergence can be reduced by making the flux distribution of the vertical beam deflection magnetic field in a barrel shape type and the flux distribution of the horizontal beam deflection magnetic field in a pin-cushion shape type. However, if the barrel shape and pin-cushion shape are exaggerated too much, there may be a fear that a new beam misconvergence occurs thereby. In practice, the beam misconvergence as shown in FIG. 1 is not eliminated even if such vertical and horizontal beam deflection magnetic fields as mentioned above are employed, but reduced all over the screen. Especially, in the case of a cathode ray tube having a wide beam deflection angle, even if the vertical beam deflection magnetic field with the flux distribution of the barrel shape type and the horizontal beam deflection magnetic field with the flux distribution of the pin-cushion shape type are employed, the beam misconvergence remarkably remains as shown in FIG. 1.

Figure 2:
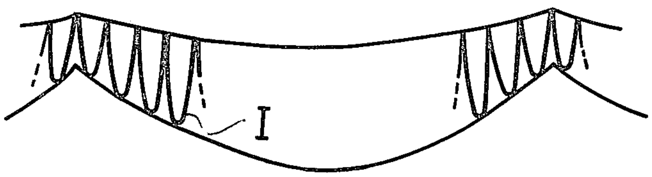
FIG. 2 is a schematic diagram showing a waveform of a convergence current used for compensating for the misconvergence shown in FIG. 1.

With the present invention, such a beam misconvergence is compensated for by providing a dynamic convergence coil device on the cathode ray tube in addition to the main beam deflection device, and by flowing a predetermined current I through the dynamic convergence coil device to originate therefrom an auxiliary beam deflection field. In this case, the current I is required to have a waveform which is varied in parabolic manner in the line period rate and field period rate, as shown in FIG. 2.

An embodiment of the dynamic convergence circuit according to the present invention which produces the current I mentioned above will be now described with reference to FIG. 3.

Figure 3:
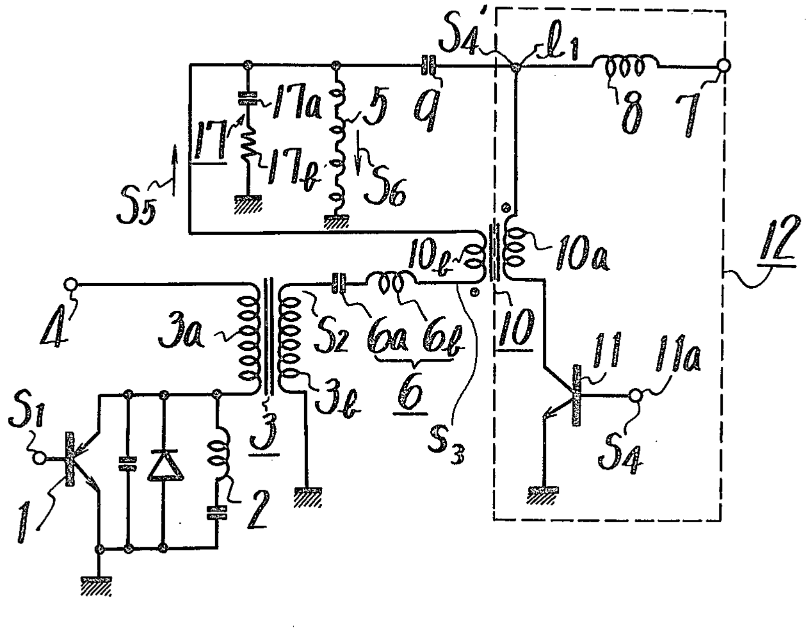
FIG. 3 is a schematic circuit diagram showing one embodiment of a dynamic convergence circuit according to the present invention.

In FIG. 3, reference numeral 1 designates a switch element which is switched by a horizontal driving signal $S_1$. A Gate Controlled Switch (GCS) is employed as such a switch element in the illustrated embodiment. The GCS 1 is connected with a horizontal deflection coil 2 in parallel thereto and also with a primary winging 3*a* of a horizontal output transformer 3 at its one end. The primary coil 3*a* is led at its other end to a DC voltage source terminal 4.

A dynamic convergence coil 5 is connected so that the convergence current (shown in FIG. 2) for correcting the beam misconvergence is obtained. To this end, a secondary winding 3*b* of the transformer 3 is connected through a wave shaping circuit 6 consisting of a capacitor 6*a* and a coil 6*b* and also through a secondary winding 10*b* of a saturable reactor 10 to the dynamic convergence coil 5. A DC voltage source terminal 7 is connected to the dynamic convergence coil 5 through a coil 8 and a capacitor 9 provided for blocking a DC current. A connection point $l_1$ between the coil 8 and the capacitor 9 is connected through a primary winding 10*a* of the saturable reactor 10 to a transistor 11. An integrating circuit 17 consisting of a capacitor 17*a* and a resistor 17*b* is connected in parallel to the dynamic convergence coil 5. A circuit 12 shown in FIG. 3 by a dotted line block including the transistor 11 is called as a circuit compensating for pin-cushion distoritions of a raster. In the circuit 12, an input terminal 11*a* of the transistor 11 is supplied with a parabolic wave signal $S_4$ (shown in FIG. 4B) with a period of the field interval, as well known.

Figure 4A:
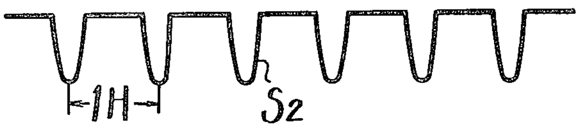
FIGS. 4A to 4E are schematic waveform diagrams used for explaining the operation of the dynamic convergence circuit shown in FIG. 3.

The operation of the dynamic convergence circuit shown in FIG. 3 will be now given. Through the secondary winding 3*b* of the horizontal output transformer 3, there is obtained a horizontal pulse $S_2$ shown in FIG. 4A. While, at the collector of the transistor 11 included in the circuit 12 which is provided to compensate for the pin-cushion distortions of the raster, there is obtained a parabolic wave signal $S'_4$ shown in FIG. 4C which is based upon the parabolic wave signal $S_4$ having a period equal to the field interval shown in FIG. 4B, and reversed in phase relative to the signal $S_4$.

Figures 4B, 4C, 4D, 4E:
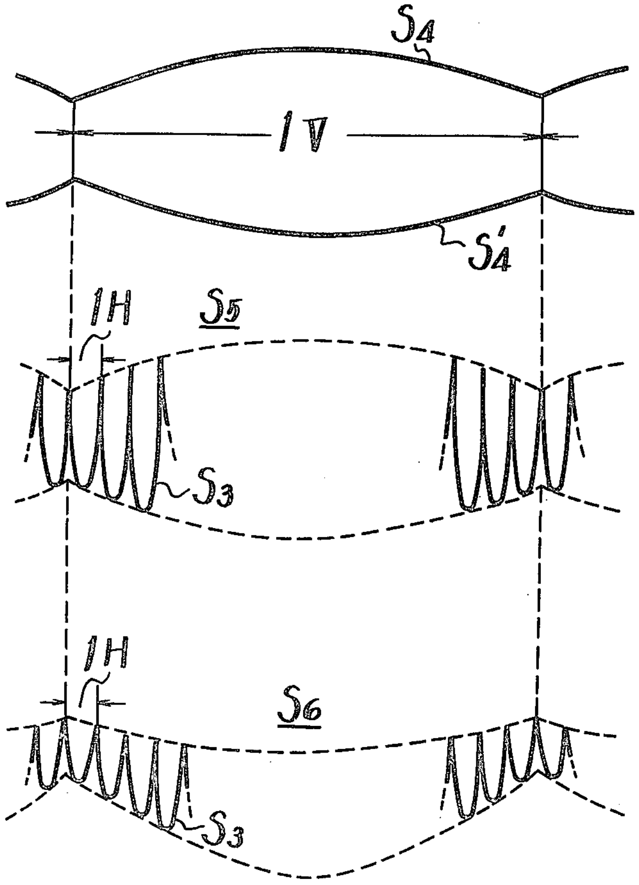

Through the secondary winding 10*b* of the saturable reactor 10, a parabolic waveform current $S_3$, shown in FIG. 4C, with a period of line interval flows. The current $S_3$ is produced by the supply of a sawtooth waveform voltage which is formed by the wave shaping circuit 6 and the integrating circuit 17 supplied with the horizontal frequency pulse $S_2$ obtained at the secondary winding 3*b* of the transformer 3. The parabolic waveform current $S_3$ is amplitude-modulated by the parabolic signal $S'_4$ applied from the collector of the transistor 11 to the primary winding 10*a* of the saturable reactor 10, so that current $S_5$ comprising the parabolic current $S_3$ amplitude-modulated as shown in FIG. 4D flows through the dynamic convergence coil 5. At the same time, the parabolic signal (voltage) $S'_4$ is obtained at the connection point $l_1$, so that the dynamic convergence coil 5 is supplied with the current $S_5$ and also with the parabolic signal $S'_4$, respectively. As a result, the current $S_5$ is further amplitude-modulated by the parabolic waveform signal $S'_4$, and in practice, through the dynamic convergence coil 5 a current $S_6$ shown in FIG. 4E flows. The current $S_6$ is of the same as that shown in FIG. 2.

Thus, the convergence correcting current $S_6$ which flows through the dynamic convergence coil 5 is made as a current with the necessary waveform as shown in FIG. 2 by amplitude-modulating the parabolic wave current with the period of line interval by the parabolic signal with the period of field interval doubly, so that even at the left and right edge portions of the picture-screen there occurs no excess compensation and hence the beam misconvergence can be corrected positively.

As described above, with the dynamic convergence circuit according to the present invention, it is enough for producing the necessary convergence current only to provide the saturable reactor 10 which has the primary and secondary windings in association with the pin-cushion distortion correcting circuit and so that the dynamic convergence circuit of the invention is simple in construction but positive in operation.

The above description is given on only one preferred embodiment, but it will be apparent that many modifications and variations could be effected by those skilled in the art without departing from the spirit and scope of the novel concepts of the present invention.

We claim as our invention:

1. A dynamic convergence circuit comprising:

a. pulse producing means for generating a pulse train having a period of the line interval of a television signal, b. a dynamic convergence coil, c. converting means connected between said pulse producing means and said coil for converting said pulse train to a voltage waveform so as to supply a parabolic current having a period of the line interval to said coil, d. parabolic voltage producing means for generating a parabolic voltage having a period of the field interval of the television signal, e. modulating means connected to both a path of said parabolic current and said parabolic voltage producing means for modulating in amplitude said parabolic current in response to said parabolic voltage, and f. voltage supplying means for supplying said parabolic voltage to said coil to further modulate in amplitude the modulated parabolic current by said parabolic voltage.

2. A dynamic convergence circuit according to claim 1, wherein said converting means includes a waveshaping circuit and an integrating circuit.

3. A dynamic convergence circuit according to claim 1, wherein said modulating means comprises a saturable reactor having a primary winding connected to said parabolic voltage producing means and a secondary winding connected between said pulse producing means and said coil to be supplied with said parabolic current.

4. A dynamic convergence circuit according to claim 3, wherein said converting means comprises an integrating circuit connected in parallel to said coil.

5. A dynamic convergence circuit according to claim 4, wherein said parabolic voltage producing means comprises a transistor with a base supplied with a parabolic signal and a collector-emitter path connected in series to the primary winding of said saturable reactor and an inductor connected between said transistor and a DC voltage source as a load of said transistor.

6. A dynamic convergence circuit according to claim 5, wherein said voltage supplying means comprises a capacitor connecting one end of said inductor to said dynamic convergence coil.

* * * * *